Aug. 1, 1961
E. L. SCHEIDENHELM
2,994,181
TINE RETAINER FOR HARVESTER REELS
Filed Aug. 10, 1959
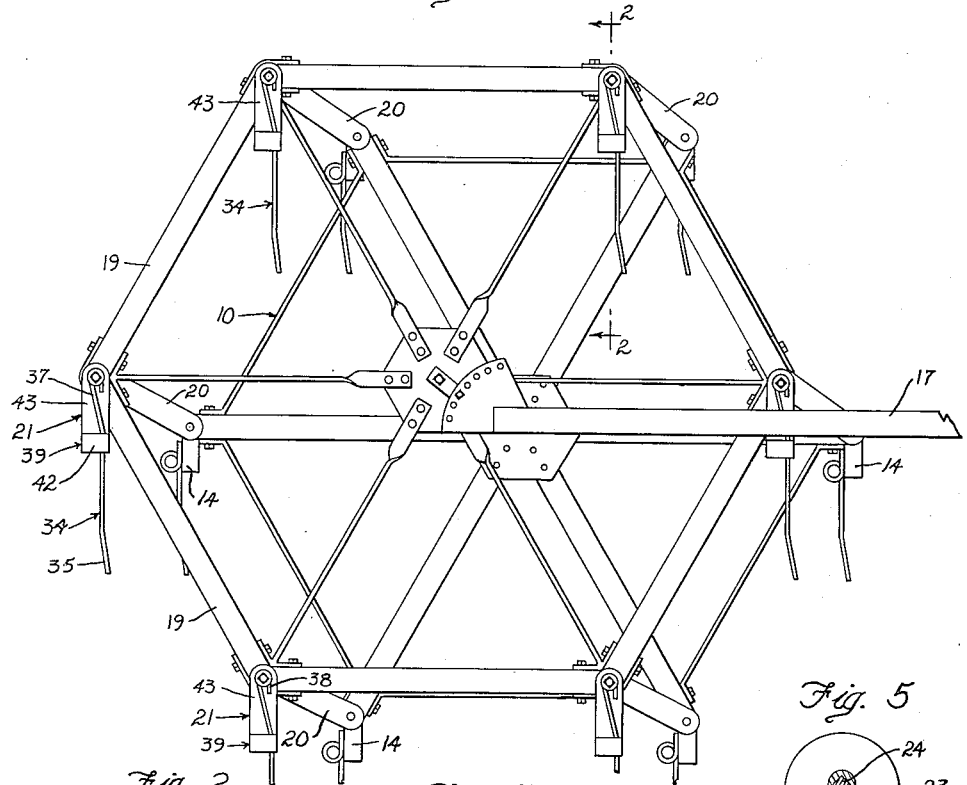
INVENTOR.
Earl L. Scheidenhelm
BY
atty.

United States Patent Office 2,994,181
Patented Aug. 1, 1961

2,994,181
TINE RETAINER FOR HARVESTER REELS
Earl L. Scheidenhelm, % H. D. Hume Co., Mendota, Ill., assignor to Horace D. Hume, Mendota, Ill.
Filed Aug. 10, 1959, Ser. No. 832,642
7 Claims. (Cl. 56—400)

The present invention relates to an improvement in outer tine retainers for harvester reels.

It is common practice in present day harvesting operations to utilize a harvester reel having depending tines thereon to pick up the crop and guide it into the cutting mechanism. The reel includes at each end, operating heads which have cranks connecting them to the tines and operate to impart a supplemental rotational movement to the tines with respect to the reel, so that the tines are maintained in a vertical position during their travel. It has been found that the inclusion of a set of outer tines, positioned on the operating heads outside the reel ends assists greatly in the harvesting operation. These outer tines straighten the crop at the ends of the reel and keep it moving past the divider boards at the ends of the cutter mechanism.

For a full description of the operation of the outer tines, reference should be made to United States Patent No. 2,795,921, issued on June 18, 1957, to Horace D. Hume.

Two problems constantly arise from the use of such outer tines in actual practice. One is the tendency of the tines to bend outward and interfere with the supporting structure of the reel. The second is the tendency of the spring steel tine to snap if it is unduly restricted by a retainer inserted through its coil to alleviate this bending.

It is the principal purpose of my invention to provide a novel retainer for these outer tines which will hold the tine more strongly in an axis parallel to the axis of the harvester reel, in order to prevent interference between the tine and the reel supporting structure during operation.

It is a further purpose of this invention to provide a retainer which will allow free motion longitudinally along the tine so as to absorb usual stress and bending without breaking the tine structure.

My improved retainer utilizes a single flat bar having a polygonal aperture at one end and a rectangular enclosure adapted to freely receive the coil. This enclosure is open longitudinally along the bar to allow free longitudinal motion by the coil during operation. The upper section of the tine is supported against the flat bar and is secured by a polygonal-cross section bolt which extends through the corresponding polygonal aperture in the bar.

The nature and advantages of my invention will appear more clearly from the following description and the accompanying drawings. It should be understood, however, that the drawings and description are illustrative only and are not intended to limit the invention except as it is limited by the claims.

In the drawings:

FIGURE 1 is a side elevation of a harvester reel equipped with my invention, with part of the lower tines broken away for ease in presentation;

FIGURE 2 is a fragmentary sectional view taken along the line 2—2 of FIGURE 1;

FIGURE 3 is another fragmentary sectional view taken along the line 3—3 of FIGURE 2;

FIGURE 4 is a sectional view taken along line 4—4 of FIGURE 3; and

FIGURE 5 is a fragmentary sectional view taken along the line 5—5 of FIGURE 2.

Referring now to the drawings and to FIGURE 1 in particular, my invention is shown in combination with a harvester reel of construction identical with that fully described in the above mentioned Patent No. 2,795,921. The reel is generally denoted as 10 and has forwardly extending carrier arms 17 supporting the reel 10 on a harvesting machine (not shown). The reel includes operating heads 19 offset with respect to the central shaft and connected to bats 14 by crank arms 20. A similar construction is provided at the opposite side of the reel. The heads 19 cause the crank arms 20 to impart a supplemental rotary motion to bats 14 as reel 10 rotates on its central axis. The construction and operation of the heads are old and well known and will not be described further.

Outside of the operating heads 19, and rotatably mounted thereon, are the outer tine retainers 21. These retainers 21 and their relationship with respect to outer tines 34 form the substance of my invention.

Each hexagonal operating head 19 carries a plurality of bearings 22 thereon, one at each corner of the head. Each of the bearings 22 receives a sleeve 23, as shown in FIGURE 2. Inside the sleeve 23 is positioned a bolt or shaft member 24 having a shank which is polygonal in cross section. The bolt 24 has a threaded portion 25 at one end thereof, and extends a short distance beyond sleeve 23 at each end. The inner end of bolt 24 receives the crank arm 20, engaging a corresponding polygonal aperture in crank arm 20 to non-rotatably seat crank arm 20 on bolt 24. The crank arm 20 is secured by a nut 28 and washer 29 which fit on the threaded portion 25 of bolt 24. At the opposite end of bolt 24 is mounted an outer tine retainer 21 by means of a corresponding polygonal aperture so as to prevent rotation between retainer 21, bolt 24 and crank arm 20.

An outer tine 34 is carried by retainer 21. This tine 34 is constructed of strong spring steel and comprises a lower crop engaging portion 35, a coiled portion 36 and an upper portion 37 terminating in a hook portion 38. The hooked portion 38 is tightly held against retainer 21 by the bolt 24. The retainer 21 further includes a rectangular enclosure generally designated as 39, which is comprised of two sides 40, 41 and a top portion 42, welded or otherwise fixed to the main flat bar portion 43 of retainer 21. This enclosure 39 is open longitudinally with respect to the bar portion 43 to permit free longitudinal flexing of coiled portion 36 during harvesting operations. The length of bar portion 43 is determined by the length of the upper portion 37 of tine 34, and is such that coiled portion 36 is encircled by the enclosure 39 when the hooked portion 38 is secured upon the bolt 24.

The harvesting operation of the tines is identical with that described in the above-mentioned Patent No. 2,795,921. The improvement herein resides in the provision of a retainer 21 which is capable of restricting any movement of coiled portion 36 along the axis of the coil, while allowing freedom for longitudinal motion by coiled portion 36 imparted by loads upon the crop engaging portion 35 of tine 34. This retainer prevents interference with carrier arms 17 which are stationary during harvesting operations. It further prevents stress upon the upper portion 37 which would result if the coiled portion 36 were totally restricted. Such stress often results in broken tines and resulting failure of the reel's operation.

The construction of retainer 21 lends itself to easy assembly by merely inserting coiled portion 36 into enclosure 39 and simultaneously bolting both hook portion 38 and bar portion 43 to the reel 10 by means of bolt 24.

It is believed that the nature and advantages of my invention appear clearly from this description and the accompanying drawings.

Having thus described my invention, I claim:

1. A tine retainer comprising an elongated bar having a flat surface, said flat surface containing a polygonal aperture at one end thereof and having an enclosure fixed at the other end thereof, said enclosure having two sides open longitudinally with respect to the bar.

2. A tine retainer comprising an elongated bar of rectangular cross section and having an upper flat elongated surface, said surface having a polygonal aperture extending through said bar at one end thereof and having mounted at its other end a fixed enclosure, said enclosure being open longitudinally with respect to the bar.

3. A tine retainer as defined in claim 2, wherein said fixed enclosure is of rectangular cross section in a plane perpendicular to the said surface.

4. In a harvester reel, the combination with a tine having a central coiled portion, of a retainer comprising a bar having an elongated flat surface, said bar having at one end an aperture and having at its other end means to enclose said coil allowing movement of said coil only in a direction along the length of the bar and bolt means for insertion through said aperture to secure said tine and said retainer to the reel, said bolt means being non-rotatable with respect to said aperture.

5. In a harvester reel, the combination with a tine having an upper section terminating in a hook configuration, an elongated crop engaging lower section and an integral coil joining said two sections, of a retainer comprising a flat bar, said retainer having a polygonal aperture through said flat bar at one end thereof, and having a fixed enclosure at the opposite end of said bar, said enclosure being open axially with respect to the bar to receive said coil within it, and a bolt having a corresponding polygonal shank adapted for insertion through said hooked configuration and said aperture to mount the combination upon the reel.

6. The structure defined in claim 5, wherein said enclosure is of rectangular cross section in a plane perpendicular to said flat bar.

7. The structure defined in claim 5, wherein said enclosure comprises two sides mounted perpendicular to said flat bar and a third side mounted upon said two sides and lying parallel to said bar.

References Cited in the file of this patent

UNITED STATES PATENTS

| | | |
|---|---|---|
| 2,795,921 | Hume | June 18, 1957 |
| 2,856,748 | Keene | Oct. 21, 1958 |